United States Patent Office 2,962,478
Patented Nov. 29, 1960

2,962,478

PLASTICIZED VINYL LEVULINATE COMPOSITION AND METHOD OF MAKING THE SAME

Reid H. Leonard, Pensacola, Fla., and Carl Bordenca, Westport, Conn., assignors to Heyden Newport Chemical Corporation, New York, N.Y., a corporation of Delaware No Drawing. Original application Oct. 13, 1954, Ser. No. 462,115. Divided and this application Jan. 20, 1958, Ser. No. 709,769

3 Claims. (Cl. 260—63)

The present invention is primarily directed to a process for internally plasticizing vinyl compounds, employing a new derivative of levulinic acid.

We have now discovered that the compound vinyl levulinate can be prepared in substantial yields from levulinic acid and that this compound has certain properties which make it a particularly useful reactant in the manufacture of synthetic resins. Particularly, we have found that vinyl levulinate reacts rather readily with various resinophors and serves to introduce a keto group into the resulting copolymers which assists in increasing the dyeability of sheets or fibers made from these synthetic resinous materials. The vinyl levulinate has the further beneficial property of acting as an internal plasticizer when reacted with resin-forming compounds which would normally be rather brittle in the absence of added plasticizers. We have found that this property of internal plasticizing is particularly noticeable when the vinyl levulinate is reacted with an ethylenically unsaturated resinophor, particularly the vinyl compounds such as vinyl chloride, vinyl acetate, styrene (vinyl benzene), acrylonitrile (vinyl cyanide) and the like.

It is well known that compounds such as vinyl chloride polymerize to form strong and tough polymers which have the undesirable feature of being quite brittle. To overcome this brittleness, it has been common practice to include a substantial amount of a plasticizer in the polyvinyl chloride, or to copolymerize the vinyl chloride with small amounts of vinyl acetate. In both instances, there is usually a substantial reduction in the strength of the plasticized composition, due to the presence of the plasticizer whether plasticizer is extraneously added or present as a copolymer.

We have now discovered that vinyl compounds of this type which tend to be brittle can be internally plasticized, without substantial losses in strength, by copolymerizing the vinyl compound with vinyl levulinate. In many cases, the tensile strength of a film produced from the vinyl levulinate copolymer is substantially greater than that obtained by copolymerizing the same vinyl compound with other members of the vinyl family.

An object of the present invention is to provide a method for increasing the flexibility and other physical properties of vinyl resins by the copolymerization of such resins with vinyl levulinate.

A still further object of the invention is to provide improved internally plasticized vinyl resin compositions containing vinyl levulinate.

The vinyl levulinate of the present invention can be produced by the transesterification of levulinic acid with a vinyl ester such as vinyl acetate in the presence of a mercuric acetate catalyst in an acid medium.

In a specific example, ten moles of vinyl acetate, five moles of levulinic acid, one gram of mercuric acetate and one gram of sulphuric acid were refluxed for eighty hours. The reaction mixture was distilled and a total of 542 ml. were collected between a temperature of 74° C. at 24 mm. mercury pressure absolute and 158° C. at 12 mm. This product was redistilled through a 6 inch column to yield 150 ml. of material boiling between 70 and 77° at 20 mm.

Additional amounts of the crude vinyl levulinate were prepared from 1860 ml. of freshly distilled vinyl acetate, 410 ml. technical levulinic acid, 2 gm. mercuric acetate, and 1.5 gm. of sulfuric acid. The mixture was heated to a temperature of 46° C. for 66 hours. Then, 5 gm. of sodium acetate were added and the mixture was washed with four 250 ml. portions of water. A final wash with 250 ml. of water containing 48 gms. of sodium hydroxide was made. The neutral oils were then distilled to recover 1110 ml. of unreacted vinyl acetate. The remaining product was distilled at temperatures varying from 52° C. at an absolute pressure of 8 mm. of mercury to 104° C. at a pressure of 6 mm. to produce 372 ml. of the product.

The crude vinyl ester from both of these reactions was combined and washed with a 4% sodium bicarbonate solution, after which the mixture was dried with anhydrous sodium carbonate. The crude product was distilled under vacuum and all fractions having an index of refraction above 1.43 were assembled into one batch. The partly refined ester still had an acid equivalent of about 0.1 N. This crude material was then distilled through a column for a second time, but with a somewhat higher reflux ratio. The following fractions were collected:

| Time in Hours | Vapor Temp., °C. | Pressure, mm. Hg | Distillate | | |
|---|---|---|---|---|---|
| | | | Volume, ml. | Index, 23° C. | Acidity, N |
| T | 92 | 17 | 34 | 1.4245 | .0675 |
| T+½ | 94 | 17 | 37 | 1.4318 | .258 |
| T+1 | 94 | 17 | 68 | 1.4370 | .129 |
| T+1½ | 94.5 | 17 | 59 | 1.4372 | .098 |
| T+2 | 94.5 | 17 | 84 | 1.4382 | .083 |
| T+2½ | 94.5 | 17 | 61 | 1.4386 | .036 |
| T+3 | 94 | 17 | 65 | 1.4390 | .059 |
| T+3½ | 94 | 17 | 64 | 1.4392 | |
| T+4 | 93 | 17 | 44 | 1.4392 | |
| T+4½ | | | 54 | 1.4393 | |
| T+5 | 91 | 15 | 50 | 1.4393 | |
| T+5½ | 91 | 15 | 57 | 1.4395 | |
| T+6 | 91 | 15 | 68 | 1.4395 | .041 |

The material which had a refractive index of 1.4393 at 23° C. had a specific gravity of 1.0311 at 29° C., as compared with water at 29° C. Apparently, the pure compound vinyl levulinate has a boiling point of about 90 to 92° C. at 15 mm. mercury pressure, and an index of refraction between 1.43 and 1.44 at 23° C.

The vinyl levulinate prepared as described above was copolymerized with vinyl chloride, vinyl acetate, styrene, and acrylonitrile. In each case, the physical properties of the copolymer showed improvements in one or more physical properties as compared with the polymerized vinyl compound alone. The amount of vinyl levulinate required to obtain the improved properties, of course, varies with the starting material but in general, it was found that the use of from 10% to about 80% of vinyl levulinate in the resulting mixture increased the flexibility of the polymer, or increased its tensile strength, or both.

The following two examples illustrate the preparation of copolymers of vinyl levulinate with vinyl chloride and with acrylonitrile, as well as the physical test results obtained. It will be realized, however, that other vinyl compounds such as styrene and vinyl acetate can be reacted in the same manner with suitable changes in temperature and quantities depending upon the particular material being employed.

EXAMPLE I

A mixture containing 90 parts by weight of vinyl chloride and 10 parts by weight of vinyl levulinate was suspended in a water solution of dihexyl sodium sulfosuccinate (Aerosol MA) containing benzoyl peroxide to the extent of 0.3% of the weight of the vinyl compounds. This mixture was then heated in a stainless steel reactor at a temperature of 45° to 55° C. for a period of 72 hours. The product was a heavy putty-like solid which analyzed 0.6% levulinic acid.

The above procedure was repeated using a mixture of 80% vinyl chloride and 20% vinyl levulinate. The levulinic acid content of this product increased to 3.3% as determined by the iodimetric method.

Films made from both of these copolymers exhibited good strength and flexibility. The flexibility was considerably greater than that achieved by the polymerization of vinyl chloride alone under the same conditions.

A comparison was made between the copolymer containing 3.3% levulinic acid (4.04% vinyl levulinate) and vinyl chloride with a commercial vinyl chloride-vinyl acetate copolymer (Bakelite resin type VYDR) which contains copolymerized vinyl chloride and vinyl acetate in the ratio of about 96 to 4. Films were cast from each copolymer, with methyl ethyl ketone being used as the solvent for the vinyl chloride-vinyl levulinate copolymer and cyclohexanone being used to dissolve the vinyl chloride-vinyl acetate material. No plasticizer was added in either solution.

After drying for several days, the films were removed from the glass plate and test samples were cut with the aid of a template. The test samples were cut across the direction in which the film was cast and also parallel to that direction. The tensile strength determinations were made by using a Scott Incline Plane Tester. The results of these tests are shown in the following table:

*Tensile properties of films*

| Film | Sample a | Thickness (mils) | Break (lb.) | Strength (lb./mil) | Average Strength |
|---|---|---|---|---|---|
| VYDR | A s | 0.62 | 1.22 | 1.97 |  |
|  | B s | 0.70 | 1.55 | 2.17 |  |
|  | C s | 0.66 | 1.27 | 1.93 |  |
|  | D s | 0.68 | 1.42 | 2.09 | 2.1 |
|  | E s | 0.64 | 1.52 | 2.38 |  |
|  | F 1 | 0.80 | 1.75 | 2.19 | 2.2 |
|  | G 1 | 0.78 | 1.95 | 2.50 |  |
|  | H 1 | 0.56 | 1.12 | 2.00 |  |
|  | J 1 | 0.62 | 1.45 | 2.34 | 2.3 |
|  | K 1 | 0.74 | 1.55 | 2.09 |  |
|  | L 1 | 0.74 | 1.80 | 2.43 |  |
| Vinyl Chloride-Vinyl Levulinate | A s | 0.94 | 3.30 | 3.52 |  |
|  | B s | 1.06 | 3.35 | 3.16 |  |
|  | C s | 0.92 | 3.92 | 4.28 | 3.8 |
|  | D s | 1.10 | 4.47 | 4.30 |  |
|  | E s | 1.25 | 4.90 | 3.92 | 3.7 |
|  | F 1 | 1.08 | 3.87 | 3.58 |  |
|  | G 1 | 0.86 | 3.35 | 3.90 |  |
|  | H 1 | 1.06 | 3.17 | 2.99 | 3.6 |
|  | J 1 | 0.90 | 3.20 | 3.56 |  |
|  | K 1 | 0.88 | 3.35 | 3.82 |  | a Samples measured ¼ in. x 4 in.
s Sample taken across or 90° to the direction of casting.
1 Sample taken parallel to the direction the film was cast.

EXAMPLE II

A copolymer of vinyl levulinate and acrylonitrile was made by a process of emulsion polymerization. A persulfate-bisulfite oxidation-reduction system acted as the polymerization initiator.

A water phase was made up of the following components:

|  | Gm. |
|---|---|
| Water | 540.0 |
| Aerosol MA | 20.0 |
| Ammonium persulfate | 1.2 |
| Ammonium bisulfate (26% solution) | 1.6 |
| Potassium dihydrogen phosphate | 1.8 |

To 205 ml. of the above solution were added 25 g. of the monomers. The samples were sealed in screw cap bottles and agitated in a thermostatically controlled water bath until polymerized. The copolymer was isolated by salting out with aluminum sulfate solution, followed by two washings with water in a Waring Blendor. The following table summarizes the extent of the reaction obtained after 24 hours agitation at 45° C., the levulinic acid analysis being made by the iodimetric method:

| Monomer | Yield Polymer, g. | Levulinic Acid Analysis, percent |
|---|---|---|
| 25 gm. acrylonitrile | 22.8 | 0.0 |
| 20 gm. acrylonitrile, 5 gm. vinyl levulinate | 4.95 | 5.8 |
| 15 gm. acrylonitrile, 10 gm. vinyl levulinate | 1.25 | 11.1 |

Films of the resulting products were cast either from dimethylformamide or dimethylpyrrolidone solvents. The film resulting from the 100% acrylonitrile polymer was too brittle to be handled in the unplasticized condition, whereas the films containing vinyl levulinate were quite flexible. The film resulting from the mixture of 4 parts acrylonitrile to 1 part vinyl levulinate had a tensile strength of 1.23 pounds per mil thickness per 0.5 inch width, while that from the last example had a tensile strength of 0.66 pound per mil thickness per 0.5 inch width.

From the foregoing, it will be seen that the compound vinyl levulinate has substantial advantages when incorporated in synthetic resin compositions to act as an internal plasticizer. Furthermore, the resins made from such copolymerization appear to have substantially improved dyeing properties in that they are more receptive to dyes than are many of the synthetic resin fibers or sheets.

It will be evident that various modifications can be made to the described embodiments without departing from the scope of the present invention.

This application is a division of our copending application Serial No. 462,115, filed October 13, 1954, now abandoned and entitled "Vinyl Levulinate."

We claim as our invention:

1. An internally plasticized resin composition comprising a copolymer of vinyl levulinate with a compound of the group consisting of vinyl chloride, vinyl acetate, styrene, and acrylonitrile, the vinyl levulinate component being 10 to 80% of the copolymer, said vinyl levulinate being sufficient to increase the flexibility of the copolymer above that obtainable by the polymerization of said compound alone under the same conditions of polymerization.

2. The method of internally plasticizing a polymer of a compound selected from the group consisting of vinyl chloride, vinyl acetate, styrene, and acrylonitrile which comprises reacting said compound with vinyl levulinate under elevated temperatures in the presence of a peroxide catalyst for a time sufficient to cause copolymerization to occur, and recovering the resulting copolymer.

3. The method of making an internally plasticized resin composition which comprises reacting a compound selected from the group consisting of vinyl chloride, vinyl acetate, styrene, and acrylonitrile with vinyl levulinate under elevated temperatures in the presence of a peroxide catalyst for a time sufficient to cause copolymerization to occur, and casting said copolymer into a film.

References Cited in the file of this patent

UNITED STATES PATENTS 2,321,897     Britton et al.     July 15, 1935

OTHER REFERENCES

Ishii et al.: J. Chem. Soc., Japan, Ind. Chem. Sec., 57 (pp. 667–70), 1954.